United States Patent [19]

Friedrich

[11] 4,150,908

[45] Apr. 24, 1979

[54] QUICK CONNECT ASSEMBLY

[76] Inventor: Herbert H. Friedrich, 2137 N. Malton Ave., Simi Valley, Calif. 93063

[21] Appl. No.: 908,871

[22] Filed: May 23, 1978

[51] Int. Cl.² .................. F16B 2/14; F16D 1/00; F16L 23/00
[52] U.S. Cl. .................. 403/341; 403/374; 403/393; 403/396
[58] Field of Search .............. 403/341, 331, 286, 293, 403/339, 340, 409, 388, 374, 396, 393, 368, 363; 248/219.3, 225.4, 230; 285/325

[56] References Cited

U.S. PATENT DOCUMENTS

| 1,005,834 | 10/1911 | Hibbler | 403/341 X |
| 2,863,685 | 12/1958 | Boyce | 403/341 X |
| 3,762,749 | 10/1973 | Pansini | 403/341 |

FOREIGN PATENT DOCUMENTS

| 54546 | 1/1911 | Fed. Rep. of Germany | 403/341 |
| 10330 of | 1913 | United Kingdom | 403/341 |
| 466232 | 5/1937 | United Kingdom | 403/341 |

*Primary Examiner*—Wayne L. Shedd
*Attorney, Agent, or Firm*—Nilsson, Robbins, Dalgarn, Berliner, Carson & Wurst

[57] ABSTRACT

A quick connect assembly comprises a semicircular cross-sectioned wedge member attached to the outside surface of a pole. A pin protrudes through the surface of the pole opposite the wedge member to provide a means of registration between the pole and a hole in a mounting portion of an accessory tool. A locking sleeve is slidably positioned on the pole so that the accessory tool is clamped firmly next to the pole when the locking sleeve is positioned around and jams against the wedge surface. A collar member is also provided to prevent the locking sleeve from sliding off the pole at the end opposite the wedge.

9 Claims, 7 Drawing Figures

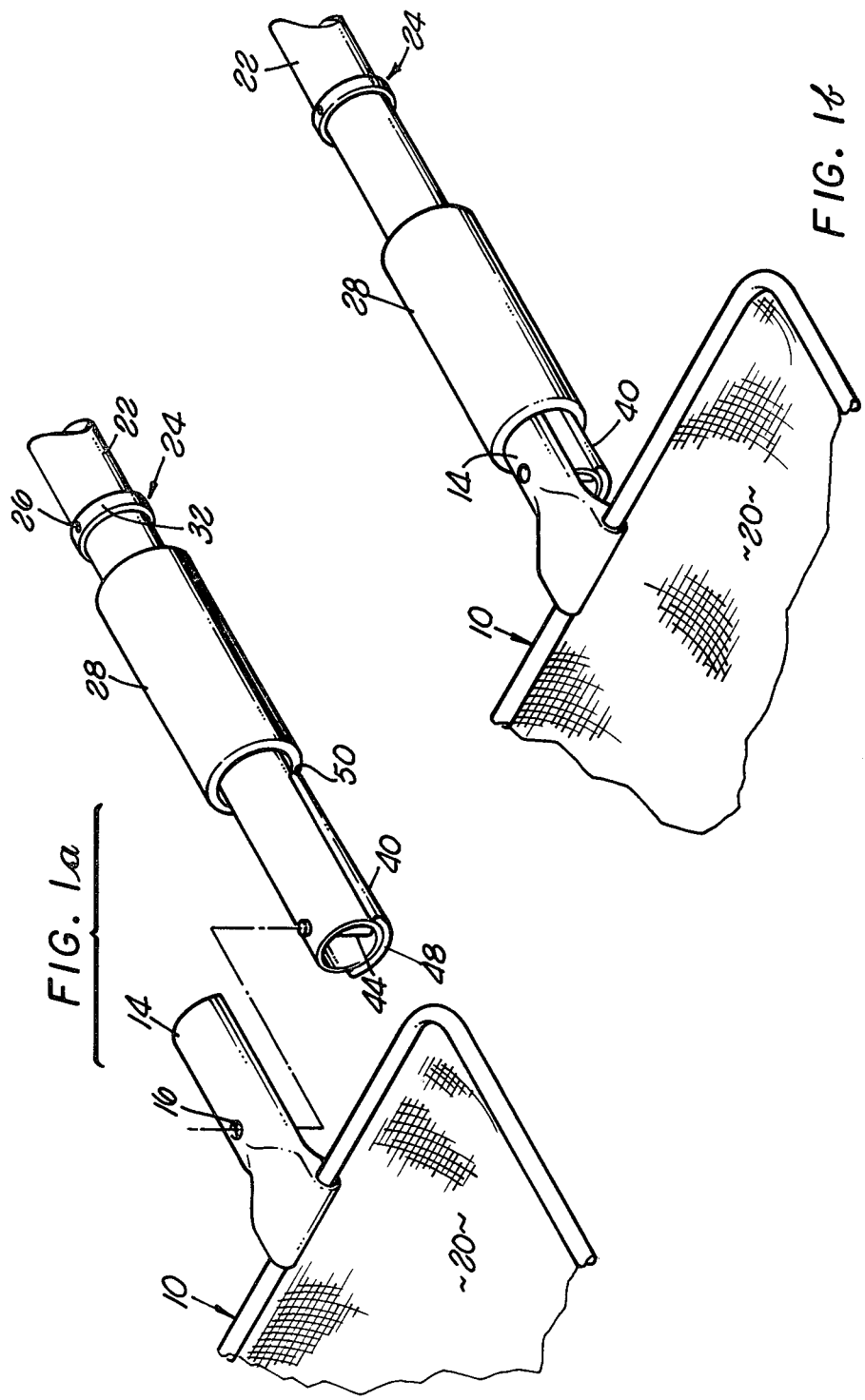

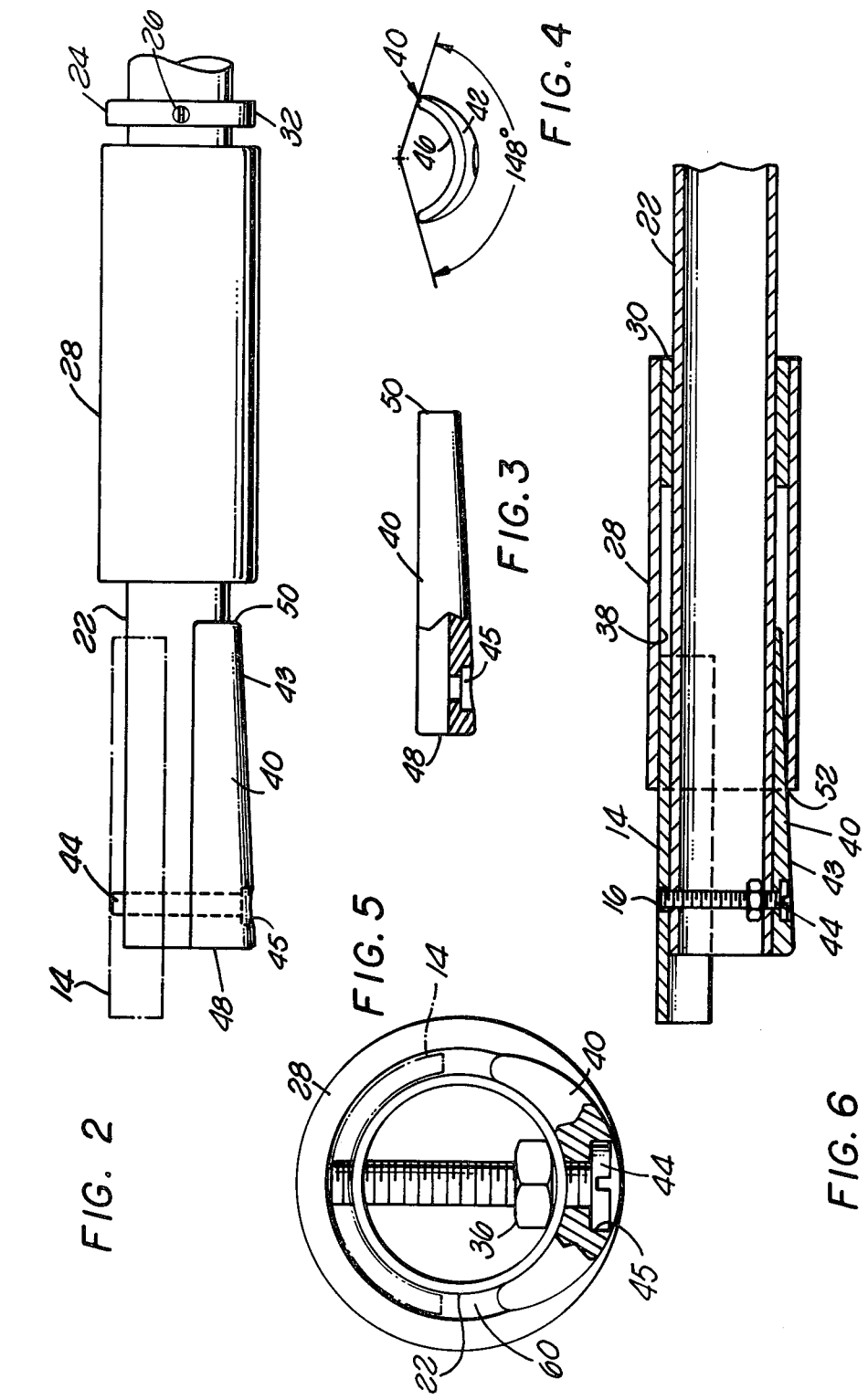

QUICK CONNECT ASSEMBLY

BACKGROUND OF THE INVENTION

The present invention relates to connecting apparatus whereby a tool or other accessory may be attached to a pole and, in particular, to a quick connect assembly whereby various accessory tools utilized in swimming pool maintenance may be quickly and easily attached and detached from a pole.

In maintaining swimming pools, it is necessary to utilize various accessory tools, such as a brush, a skimming net and a vacuum head. Because of the depth of the water and the size of the pool, the accessory tools are generally attached to the end of a long pole with the operator performing the desired maintenance activity by pushing and pulling the pole back and forth.

In the pool maintenance business, it is frequently necessary to perform one maintenance activity after another where each maintenance activity requires a different accessory tool. Since only one pole is generally utilized, it is thus necessary to remove one accessory tool and attach another to the end of the pole in order to perform successive pool maintenance operations.

Accessory tools have generally been attached to the end of the pole by a pair of screws which extended through the pole and a mounting portion of the accessory tool. A pair of wing nuts are then put on the screws and tightened to hold the mounting portion against the pole. Although this technique firmly holds the accessory tool to the pole, the changing procedure requires that the wing nuts be removed, the accessory tool taken from the screws, a new accessory tool placed on the end of a pole with the screws extending therethrough and each wing nut again placed on the screw and tightened. Not only is this technique slow, but the wing nuts can be easily lost or misplaced. In addition, such a changing operation generally requires the use of two hands and necessitates that the pole and accessory tool be placed on the ground or otherwise put down before the changing operation can be completed. Such an attachment apparatus is illustrated in U.S. Pat. No. 2,769,549.

In order to overcome some of these problems, a connector device for connecting pool cleaning tools to a conventional tubular handle or pole is disclosed in U.S. Pat. No. 3,762,749. While this connector device eliminates the two wing nuts, it is still necessary to loosen a set screw to remove an accessory tool and to tighten a set screw to clamp an accessory tool to the pole.

By contrast to the above-referenced patents, the present invention provides a coupling apparatus which does not require any such set screws or wing nuts and provides a means whereby the mounting portion of an accessory tool may be placed against the outside of a pole and clamped there by a locking sleeve. The locking sleeve clamps the mounting portion to the pole utilizing a wedge member which is fixed to the pole at a circumferential location opposite to that at which the mounting portion of the accessory tool is positioned so that as the sleeve slides longitudinally along the wedge portion, the increasing thickness of the wedge pulls the sleeve down against the mounting portion of the accessory tool thereby clamping the mounting portion between the outside diameter of the pole and the inside surface of the locking sleeve.

The wedge may be attached to the pole by a countersunk bolt or screw having an end protruding through the opposite side of the pole to provide a registration means so that the accessory tool may be held longitudinally fixed relative to the pole in a manner similar to that shown in U.S. Pat. No. 3,762,749. An accessory tool may thus be quickly and easily changed without the necessity of putting the tool down by simply placing the mounting portion of the accessory tool in registration with the pin portion of the bolt holding the wedge to the pole and then sliding the locking sleeve over the end of the mounting portion until the locking sleeve jams against the wedge surface. The accessory tool may be easily removed by simply pulling up on the locking sleeve.

Various coupling apparatus are also shown in U.S. Pat. Nos. 309,324 and 309,444. However, in each of these patents, it is necessary to have two wedged surfaces, one on each of the members to be coupled. By contrast, the present invention incorporates but a single wedged member which is attached just to the pole. The mounting portion of the accessory tool does not need to be and generally will not be a wedged surface. In addition, in both of the patents cited, the locking sleeve must have a tapered or conical interior surface to provide optimal coupling. Indeed, in U.S. Pat. No. 309,444, such a tapered interior surface corresponding to the taper of the wedge is necessary to prevent leakage of that coupling apparatus. By contrast, the present invention has a cylindrical, non-tapered inside surface. Furthermore, coaxial alignment can be maintained and is indeed desirable for optimum function of the invention, by attaching an alignment sleeve having an inside diameter just slightly larger than the outside diameter of the pole to the inside surface of the locking sleeve. No such continuous, coaxial alignment, regardless of the location of the locking sleeve, exists or is even desirable in the inventions disclosed in the above patents.

Furthermore, in each of the above patents, the cross-sectional area through the coupling portion is circular whereas, in the present invention, the cross-sectional area is not circular but rather is a modified circular cross section comprising a circular cross section with a protrusion from one portion of the surface defining the cross section of the wedge member.

In U.S. Pat. No. 1,490,705, a detachable beater connection is shown which utilizes a locking sleeve. However, as in the previously-discussed patents, the interior surface of the locking sleeve must be conical and requires that two surfaces rather than a single surface be sloped to provide the wedge effect. Furthermore, in all of the above patents, the coupling apparatus cannot be easily adapted, if it can be adapted at all, to modify existing devices in accordance with its teaching.

By contrast, the present invention can be utilized with existing accessory tools without any modification to the mounting portion of the accessory tool by simply attaching the various elements of the invention to the pole. Thus, the present invention may be easily attached to the end of an existing pole by simply slipping a collar over the pole and tightening a screw to fix the collar to the pole, slipping the locking sleeve over the end of the pole and, finally, attaching the wedge to the pole utilizing a screw which is provided to protrude through the pole to provide a registration means.

SUMMARY OF THE INVENTION

The present invention is a coupling assembly for attaching an accessory tool to a pole where the pole has an outside pole surface and the accessory tool has a laterally cut-away mounting portion. The mounting portion is shaped for being positioned adjacent to the outside pole surface. The coupling apparatus for attaching such an accessory tool to a pole generally comprises a wedge member which is adapted for attachment to the pole. The wedge member has an outside wedge surface which is tapered along its length. Registration means is provided for aligning the mounting portion of the accessory tool and the pole so that the accessory tool is longitudinally immovable relative to the pole. The mounting portion of the accessory tool will then generally be aligned opposite to and in non-contacting relationship with the wedge member. A locking sleeve is then slidably mounted on the pole for being positioned in clamping relationship against the mounting portion and in wedging relationship against the outside wedge surface of the wedge member for rigidly and immovably clamping the mounting portion of the accessory tool to the pole.

A coaxial alignment sleeve may also be incorporated for being fixed to the locking sleeve between the pole and the interior surface of the locking sleeve for maintaining generally coaxial alignment between the locking sleeve and the pole.

Finally, in the preferred embodiment of the present invention, a collar is fixed to the pole on the side of the locking sleeve remote from the wedge. The collar has an outside surface with a diameter greater than the interior surface diameter of the locking sleeve so that the locking sleeve cannot slide off of the opposite end of the pole.

BRIEF DESCRIPTION OF THE DRAWINGS

The invention will be better understood from the detailed description below taken in conjunction with the drawings wherein like reference characters refer to like parts throughout and in which:

FIG. 1a is a perspective view of the various elements of the present invention illustrating a pole and accessory tool in an uncoupled relationship;

FIG. 1b is a perspective view of the pole and accessory tool coupled together utilizing the coupling apparatus of the present invention;

FIG. 2 is a side plan view of the present invention illustrating the relationship between the various elements of the quick connect assembly in the uncoupled configuration.

FIG. 3 is a side plan view of the wedge element of the quick connect assembly showing a cut-away portion through one end;

FIG. 4 is an end plan view of the wedge element of the quick connect assembly of the present invention;

FIG. 5 is an end plan view of the quick connect assembly illustrated in FIG. 2 having a cut-away portion showing the registration means; and FIG. 6 is a side plan view illustrating the relationship between the various elements of the present invention in the coupled configuration illustrated in FIG. 1b.

DETAILED DESCRIPTION

Referring first to FIG. 1a, there is shown a quick connect assembly in accordance with the present invention comprising a wedge member 40 having a generally semicircular cross section along its length and a sleeve 28 slidably mounted to a pole 22. The wedge 40 preferably has an inside cylindrical surface which is generally the reciprocal of the outside surface of the pole 22 so that the wedge 40 may be attached around a portion of the outside surface of the pole 22. The wedge 40 may be fixed to the pole 22 in any manner, such as welding or soldering or may be attached by a pan head screw 44 which extends through the pole 22. The bolt 44 may also protrude through the opposite side of the pole to provide a registration means between the pole and a mounting portion 14 of an accessory tool 10.

A collar 24 may also be incorporated as part of the quick connect assembly of the present invention and may be slipped onto the pole 22 and then fixed at some point along the length of the pole 22 by a set screw 26. The collar 24 has an outside surface 32 which has a diameter larger than the inside diameter of the sleeve 28 so that the sleeve 28 is prevented from slipping off of the end of the pole 22 remote from the wedge 40.

The quick connect assembly of the present invention is adapted to clamp the accessory tool 10 to the pole 22. In FIG. 1a, the illustrated accessory tool 10 is a skimmer net 20. However, any other type of tool, such as a brush or a vacuum head, may be utilized. The mounting portion 14 of the accessory tool generally has a semicircular cross section along its length which is adapted to fit around the outside surface of the pole 22. In the preferred embodiment, the mounting portion 14 has a registration hole or orifice 16 which is adapted to fit over the portion of the pan head screw 44 extending through the surface of the pole 22. The mounting portion 14 of the accessory tool 10 is thus held longitudinally immovable relative to the pole 22 when the end of the screw 44 is in registration relationship with the orifice 16. It will be appreciated that the pole 22 and the accessory tool with a laterally cut-away mounting portion are well known in the art. Generally, the pole and mounting portion are made of aluminum or some other suitable light material resistent to corrosion by swimming pool water.

In the invention, the wedge 40 generally has a first end 48 having a first thickness and a second end 50 having a second thickness where the thickness of the first end 48 is greater than the thickness of the second end 50. In the preferred embodiment, the sum of the outside diameter of the pole 22 and the thickness of the first end 48 is greater than the inside diameter of the locking sleeve 28. By maintaining such a relationship, the locking sleeve 28 will be prevented from slipping from the end of the pole 22 when the accessory tool is not attached.

It will be appreciated, however, that other means for keeping the locking sleeve 28 from slipping from the end of the pole 22 may be incorporated. For example, the screw 44 utilized as a means of attaching the wedge 40 to the pole 22 and as a registration means may also be utilized to prevent the sleeve 28 from slipping from the pole 22. In any event, it will be appreciated that, when the hole 16 is in registration with the screw 44, the distance between the outside surface of the wedge portion 40 and the outside surface 12 of the mounting portion will, at some point along the length of the pole 22 between the first end 48 and the second 50 of the wedge 40, be larger than the inside diamter of the locking sleeve 28. Thus, the locking sleeve 28 will clamp the mounting portion 14 of the accessory tool 10 against the pole 22 as the wedge enters into the gap between the pole 22 and the interior surface of the locking sleeve 28.

Referring to FIG. 1b, the locking sleeve 28 on the pole 22 is shown wedged tightly in position around the wedge 40 and the mounting portion 14 of the accessory tool 10 as previously described.

Referring now to FIG. 2, the quick connect assembly is shown in the unlocked configuration with the locking sleeve 28 positioned on the pole 22 between the collar 24 and the wedge 40. The wedge 40 has a tapered surface 43 with the thickness of the wedge 40 at the first end 48 being greater than the thickness of the wedge at the second end 50. The thickness of the wedge at the second end 50 must be such that the sum of the outside diameter of the pole 22, the thickness of the second end 50 and the thickness of the mounting portion 14 of the accessory tool it less than the inside diameter of the locking sleeve 28. This assures that the locking sleeve will fit around both the mounting portion and the wedge. In addition, the sum of the outside diameter of the pole 22, the thickness of the mounting portion of the accessory tool 14 and the thickness of the first end 48 of the wedge 40 must be greater than the inside diameter of the locking sleeve 28 so that the locking sleeve 28 can be wedged around the outside of the mounting portion 14 and the wedge 40 at some point between the ends of the wedge thereby clamping the mounting portion 14 to the pole 22.

Referring now to FIG. 3, the wedge 40 is shown having a cut-away portion showing a countersunk hole 45 through which the pan head screw may be inserted to hold the wedge 40 against the outside surface of the pole. The hole 45 is preferably countersunk so that the head of the screw 44 will be below the inclined outside surface of the wedge 40. In the preferred embodiment, the wedge is about 4 inches long with the angle between the inside surface and the outside sloped surface being about 3°. The wedge is about ⅛ inch thick at the second end 50 and about ¼ inch thick at the first end 48.

Referring now to FIG. 4, an end view detail of the wedge member 40 illustrated in FIG. 3 is shown having a generally cylindrical inside wedge surface 46 having a semicircular cross section along the length of the wedge 40. The inside wedge surface is non-tapered and generally lies next to the outside surface of the pole 22 along the length of the wedge 40. The outside surface 42 of the wedge 40 is generally convex and defines a semicircular cross section along the length of the wedge member 40. However, the outside wedge surface is tapered radially inward from the first end 48 to the second end 50 (see FIG. 3) so that the outside convex surface 42 will preferably have a truncated conical shape which is truncated both axially and laterally. In the preferred embodiment, the angles subtended by the semicircular cross section of the wedge will be about 148° although various other angles will be possible without departing from the spirit of the present invention.

Referring now to FIG. 5, an end view of the present invention is shown having a cut-away through the wedge illustrating the positioning of the pan head screw 44 in position in the countersunk hole 45 of the wedge 40. The pan head screw 44 is held in place by a hexnut 36 which clamps the wedge 40 against the pole 22 by applying pressure to the inside surface of the pole 22. In the preferred embodiment, the pan head screw protrudes through the opposite side of the pole 22 to provide the registration means whereby the mounting portion 14 of the accessory tool is held longitudinally immovable relative to the pole 22. The locking sleeve 28 is also illustrated defining a gap 60 between the inside surface of the locking sleeve 28 and the outside surface of the pole 22.

Referring now to FIG. 6, a cross section of the quick connect assembly in accordance with the present invention is illustrated on the pole 22 in the lock position. In the preferred embodiment, an alignment sleeve portion 30 is fixed to the inside surface 38 of the locking sleeve 28. The inside diameter of the alignment sleeve 30 is just slightly greater than the outside diameter of the pole 22. Thus, the alignment sleeve 30 permits the locking sleeve 28 to be maintained in generally coaxial alignment with the pole 22 thus allowing the locking sleeve 28 to be more easily positioned in wedged relationship around the outside inclined wedge surface 43 and the mounting portion 14 of the accessory tool. Of course, it will be appreciated that such an alignment sleeve is preferred but not essential to the basic operation of the present invention.

As illustrated in FIGS. 5 and 6, in the preferred embodiment, the mounting portion of the accessory tool has a semicircular cross sectional area which subtends an angle which is preferably less than 180° to allow the accessory tool to be easily positioned around the circumference of the pole 22. In addition, it is preferable that the mounting portion of the accessory tool and the wedge 40 are positioned on opposite sides of the pole 22 so that they do not overlap.

One advantage of the present invention, and particularly when the alignment sleeve 30 is utilized, is that when the locking sleeve 28 is positioned around the outside laterally truncated cylindrical surface of the accessory tool, clamping action occurs along the entire contact length between the inside cylindrical surface 38 of the locking sleeve 28 and the outside surface of the pole 22. The only point contact is at position 52 between the leading edge of the inside cylindrical surface 38 of the locking sleeve 28 and the outside inclined surface 43 of the wedge 40. Such a point contact would cause suboptimal holding if the wedge was being held against the pole 22 by the locking sleeve 28. However, the wedge portion 40 is being held by the screw 44. Thus, the point contact 52 serves only to pull the locking sleeve against the entire surface of the mounting portion to thus provide optimal clamping and holding of the accessory tool by the locking sleeve 28 along an entire contact region.

Although the invention has been particularly described with reference to a specific embodiment illustrated in the figures, it will be appreciated that variations are possible without departing from the spirit of the present invention and that the specific embodiments shown are illustrative only and not limiting.

What is claimed is:

1. A coupling assembly for attaching an accessory tool to a pole, the pole having an outside pole surface and the accessory tool having a laterally cut-away mounting portion shaped for being positioned adjacent to the outside pole surface, the coupling assembly comprising:

a wedge member for being attached to the pole, the wedge member having an outside wedge surface tapered along its length;

registration means for aligning the mounting portion and the pole in longitudinally immovable relationship and for aligning the mounting portion generally opposite to and in non-contacting relationship with the wedge member; and a locking sleeve having an interior surface, the locking sleeve means slidably mounted on the pole for being positioned in clamping relationship against the mounting portion and in wedging relationship against the outside wedge surface of the wedge member for rigidly and immovably clamping the mounting portion of the accessory tool to the pole.

2. The coupling assembly of claim 1 wherein the interior surface of the locking sleeve is generally cylindrical and defines a passageway having a substantially constant cross-sectional area along the length of the locking sleeve.

3. The coupling assembly of claim 1 further comprising a collar fixed to the pole, the collar having an outside collar surface with a circumference greater than the inside circumference of the interior surface of the locking sleeve, the locking sleeve being slidable only between the collar and the wedge member.

4. The coupling assembly of claim 1 wherein the mounting portion of the accessory tool has an orifice therethrough, the coupling apparatus further comprising a screw for attaching the wedge member to the pole, the screw adapted to protrude through the pole for registration with the orifice in the mounting portion for providing the registration means.

5. The coupling assembly of claim 1 wherein the locking sleeve further comprises a coaxial alignment sleeve adapted for being fixed to the interior surface of the locking sleeve in the gap between the pole and the interior surface of the locking sleeve for maintaining generally coaxial alignment between the locking sleeve and the pole.

6. The coupling assembly of claim 1 wherein the wedge member is made of cast aluminum.

7. The coupling assembly of claim 1 wherein the wedge member has an inside laterally and axially truncated concave cylindrically shaped surface, the outside wedge surface being laterally and axially truncated convex conically shaped.

8. The coupling assembly of claim 1 wherein the pole is a hollow tube and the mounting portion of the tool is non-tapered in the longitudinal direction of the pole.

9. A coupling assembly for attaching an accessory tool to a pole, the pole having an outside pole surface and the accessory tool having a laterally cut-away mounting portion shaped for being positioned adjacent to the outside pole surface, the mounting portion of the accessory tool being non-tapered in the longitudinal direction of the pole when the accessory tool is attached to the pole, the coupling assembly comprising:
   a wedge member for being attached to the pole, the wedge member having an outside wedge surface tapered along its length;
   registration means for aligning the mounting portion and the pole in longitudinally immovable relationship and for aligning the mounting portion generally opposite to and in non-contacting relationship with the wedge member;
   a locking sleeve having an interior surface, the locking sleeve slidably mounted on the pole for being positioned in clamping relationship against the mounting portion and in wedging relationship against the outside wedge surface of the wedge member for rigidly and immovably clamping the mounting portion of the accessory tool to the pole, the interior surface of the locking sleeve being generally cylindrical;
   an alignment sleeve adapted for being fixed to the locking sleeve between the pole and the interior surface of the locking sleeve for maintaining generally coaxial alignment between the locking sleeve and the pole; and
   a collar fixed to the pole, the collar having an outside collar surface having a diameter greater than the diameter of the interior surface of the locking sleeve, the locking sleeve being slidable only between the collar and the wedge member.

* * * * *